United States Patent
Sugita et al.

(10) Patent No.: US 11,922,857 B2
(45) Date of Patent: Mar. 5, 2024

(54) IMAGING DEVICE WITH DISPLAY SWITCHING DETERMINATION PERIOD SETTING ACCORDING TO RELEVANCE BETWEEN IMAGING SETTING AND DISPLAY ITEM

(71) Applicant: Sony Group Corporation, Tokyo (JP)

(72) Inventors: Masanari Sugita, Tokyo (JP);
Masakazu Mitsugi, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/924,719

(22) PCT Filed: Apr. 20, 2021

(86) PCT No.: PCT/JP2021/016044
§ 371 (c)(1),
(2) Date: Nov. 11, 2022

(87) PCT Pub. No.: WO2021/235156
PCT Pub. Date: Nov. 25, 2021

(65) Prior Publication Data
US 2023/0196978 A1    Jun. 22, 2023

(30) Foreign Application Priority Data

May 19, 2020  (JP) ................. 2020-087534

(51) Int. Cl.
*G09G 3/22* (2006.01)
*G06F 3/01* (2006.01)
*G06F 3/14* (2006.01)

(52) U.S. Cl.
CPC .......... *G09G 3/22* (2013.01); *G06F 3/013* (2013.01); *G06F 3/14* (2013.01); *G09G 2320/0626* (2013.01)

(58) Field of Classification Search
CPC ...................................... G09G 3/22
See application file for complete search history.

(56) References Cited

U.S. PATENT DOCUMENTS

| 2014/0240531 | A1  | 8/2014 | Nakai |
| 2015/0062402 | A1* | 3/2015 | Kudo ............. H04N 23/63 348/333.02 |

FOREIGN PATENT DOCUMENTS

| JP | H05110908 A | 4/1993 |
| JP | H08122887 A | 5/1996 |
| JP | H08294023 A | 11/1996 |
| JP | 2015049544 A | 3/2015 |

OTHER PUBLICATIONS

International Search Report (PCT/ISA/210), International Application No. PCT/JP2021/016044, dated Jul. 13, 2021.

* cited by examiner

*Primary Examiner* — Gustavo Polo
(74) *Attorney, Agent, or Firm* — Michael Best & Friedrich LLP

(57) ABSTRACT

An imaging device includes a display switching determination period setting unit that sets a display switching determination period for each of a plurality of display items displayed on a display unit in accordance with a set imaging setting related to imaging.

16 Claims, 15 Drawing Sheets

|  | RELEVANCE | | |
|---|---|---|---|
| IMAGING MODE | HIGH | MEDIUM | LOW |
| A MODE (F-NUMBER) | F-NUMBER | SS, EXPOSURE, WB, ISO | IMAGING MODE, NUMBER OF IMAGES THAT CAN BE CAPTURED, ASPECT RATIO, IMAGE SIZE, IMAGE QUALITY, REMAINING BATTERY LEVEL |
| S MODE (SS) | SS | F-NUMBER, EXPOSURE, WB, ISO | IMAGING MODE, NUMBER OF IMAGES THAT CAN BE CAPTURED, ASPECT RATIO, IMAGE SIZE, IMAGE QUALITY, REMAINING BATTERY LEVEL |
| M MODE | SS, F-NUMBER, EXPOSURE, WB, ISO | — | IMAGING MODE, NUMBER OF IMAGES THAT CAN BE CAPTURED, ASPECT RATIO, IMAGE SIZE, IMAGE QUALITY, REMAINING BATTERY LEVEL |
| HIGH-VISIBILITY DISPLAY STATE SWITCHING DETERMINATION PERIOD TA | 0.2s | 0.5s | 1s |
| LOW-VISIBILITY DISPLAY STATE SWITCHING DETERMINATION PERIOD TB | 3s | 2s | 0.7s |

FIG. 3

| IMAGING MODE | RELEVANCE | | |
| --- | --- | --- | --- |
| | HIGH | MEDIUM | LOW |
| A MODE (F-NUMBER) | F-NUMBER | SS, EXPOSURE, WB, ISO | IMAGING MODE, NUMBER OF IMAGES THAT CAN BE CAPTURED, ASPECT RATIO, IMAGE SIZE, IMAGE QUALITY, REMAINING BATTERY LEVEL |
| S MODE (SS) | SS | F-NUMBER, EXPOSURE, WB, ISO | IMAGING MODE, NUMBER OF IMAGES THAT CAN BE CAPTURED, ASPECT RATIO, IMAGE SIZE, IMAGE QUALITY, REMAINING BATTERY LEVEL |
| M MODE | SS, F-NUMBER, EXPOSURE, WB, ISO | — | IMAGING MODE, NUMBER OF IMAGES THAT CAN BE CAPTURED, ASPECT RATIO, IMAGE SIZE, IMAGE QUALITY, REMAINING BATTERY LEVEL |
| HIGH-VISIBILITY DISPLAY STATE SWITCHING DETERMINATION PERIOD TA | 0.2s | 0.5s | 1s |
| LOW-VISIBILITY DISPLAY STATE SWITCHING DETERMINATION PERIOD TB | 3s | 2s | 0.7s |

FIG. 8
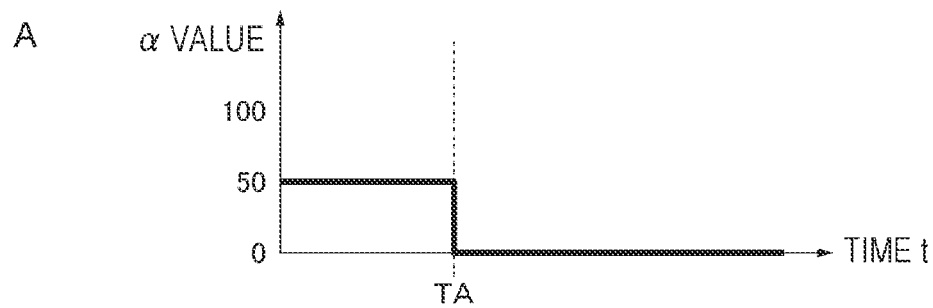
A
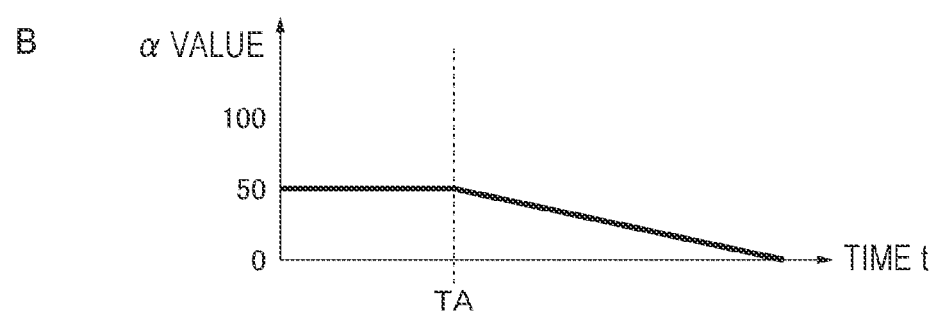
B
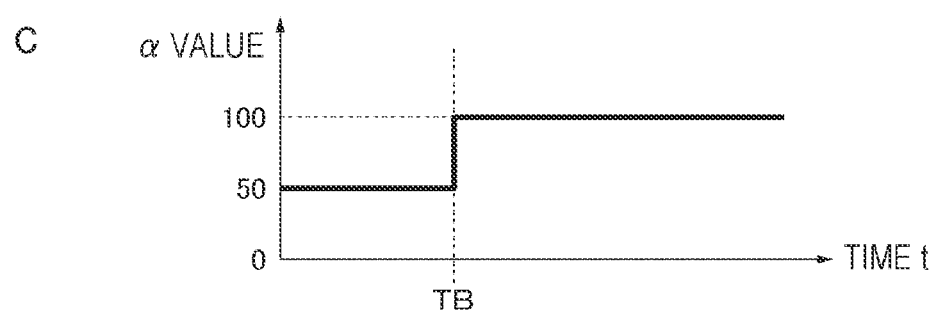
C
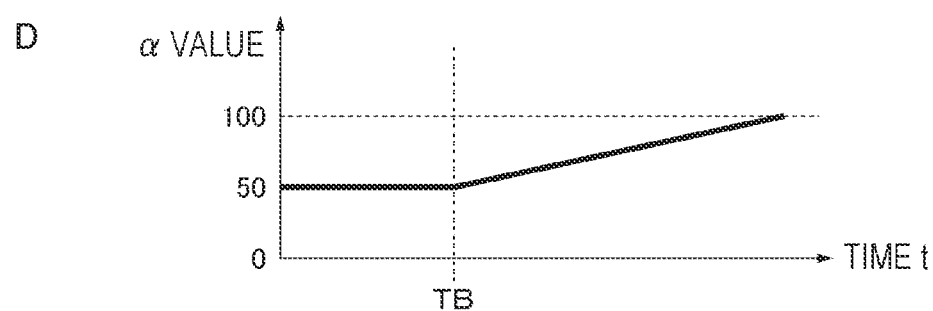
D

FIG. 14

| IMAGING SITUATION | RELEVANCE | | |
|---|---|---|---|
| | HIGH | MEDIUM | LOW |
| SPORTS | SS | F-NUMBER, EXPOSURE, WB, ISO | IMAGING MODE, NUMBER OF IMAGES THAT CAN BE CAPTURED, ASPECT RATIO, IMAGE SIZE, IMAGE QUALITY, REMAINING BATTERY LEVEL |
| PORTRAIT | F-NUMBER, EXPOSURE, WB | SS, WB | IMAGING MODE, NUMBER OF IMAGES THAT CAN BE CAPTURED, ASPECT RATIO, IMAGE SIZE, IMAGE QUALITY, REMAINING BATTERY LEVEL |
| STILL LIFE | F-NUMBER, EXPOSURE, WB | SS, WB | IMAGING MODE, NUMBER OF IMAGES THAT CAN BE CAPTURED, ASPECT RATIO, IMAGE SIZE, IMAGE QUALITY, REMAINING BATTERY LEVEL |
| LANDSCAPE | F-NUMBER, EXPOSURE, WB, ISO | SS | IMAGING MODE, NUMBER OF IMAGES THAT CAN BE CAPTURED, ASPECT RATIO, IMAGE SIZE, IMAGE QUALITY, REMAINING BATTERY LEVEL |
| NIGHT SCENE (DARK SCENE) | SS, F-NUMBER, EXPOSURE, WB, ISO | EXPOSURE | IMAGING MODE, NUMBER OF IMAGES THAT CAN BE CAPTURED, ASPECT RATIO, IMAGE SIZE, IMAGE QUALITY, REMAINING BATTERY LEVEL |
| FOOD | F-NUMBER, WB | SS, EXPOSURE, ISO | IMAGING MODE, NUMBER OF IMAGES THAT CAN BE CAPTURED, ASPECT RATIO, IMAGE SIZE, IMAGE QUALITY, REMAINING BATTERY LEVEL |
| HIGH-VISIBILITY DISPLAY STATE SWITCHING DETERMINATION PERIOD TA | 0.2s | 0.5s | 1s |
| LOW-VISIBILITY DISPLAY STATE SWITCHING DETERMINATION PERIOD TB | 3s | 2s | 0.7s |

IMAGING DEVICE WITH DISPLAY SWITCHING DETERMINATION PERIOD SETTING ACCORDING TO RELEVANCE BETWEEN IMAGING SETTING AND DISPLAY ITEM

TECHNICAL FIELD

The present disclosure relates to an imaging device, a method for controlling an imaging device, and a program.

BACKGROUND ART

There is known an imaging device having a line-of-sight detection function and performing control in accordance with a line-of-sight detection result. For example, Patent Document 1 below describes a video camera that clears display of a function menu displayed on a viewfinder in a case where there is no command input due to coincidence of a line-of-sight for a predetermined time.

CITATION LIST

Patent Document

Patent Document 1: Japanese Patent Application Laid-Open No. H05-110908

SUMMARY OF THE INVENTION

Problems to be Solved by the Invention

Meanwhile, in the imaging device, display items are displayed to be superimposed on a through image, an image being captured, or the like by On-screen display (OSD). The display items include a remaining battery level, the number of images that can be captured, the shutter speed, the ISO sensitivity, and the like. Since it is difficult to set a display switching determination period in accordance with an imaging setting that is a setting related to imaging set in an imaging device in the technique described in Patent Document 1, there is a problem that a necessary display item disappears immediately from a screen or an unnecessary display item remains on the screen.

An object of the present disclosure is to provide an imaging device that more appropriately performs display control, a method for controlling an imaging device, and a program.

Solutions to Problems

The present disclosure provides, for example,
an imaging device including
a display switching determination period setting unit that sets a display switching determination period for each of a plurality of display items displayed on a display unit in accordance with a set imaging setting related to imaging.

The present disclosure provides, for example,
a method for controlling an imaging device, the method including
setting, by a display switching determination period setting unit, a display switching determination period for each of a plurality of display items displayed on a display unit in accordance with a set imaging setting related to imaging.

The present disclosure provides, for example,
a program for causing a computer to execute a method for controlling an imaging device, the method including setting, by a display switching determination period setting unit, a display switching determination period for each of a plurality of display items displayed on a display unit in accordance with a set imaging setting related to imaging.

BRIEF DESCRIPTION OF DRAWINGS

FIG. 3 is a view illustrating an example of a display switching determination period set for each of a plurality of display items in accordance with relevance between an imaging mode and the display item.

FIGS. 8A to 8D are views that are referred to when describing the display control according to the embodiment.

FIG. 14 is a view for describing a modified example.

MODE FOR CARRYING OUT THE INVENTION

Hereinafter, an embodiment and the like of the present disclosure will be described with reference to the drawings. Note that a description will be given in the following order.
<Embodiment>
<Modified Examples>

The embodiment and the like to be described hereinafter are preferred specific examples of the present disclosure, and the content of the present disclosure is not limited to the embodiment and the like.
<Embodiment>
[Configuration Example of Imaging Device]

Figure 1:
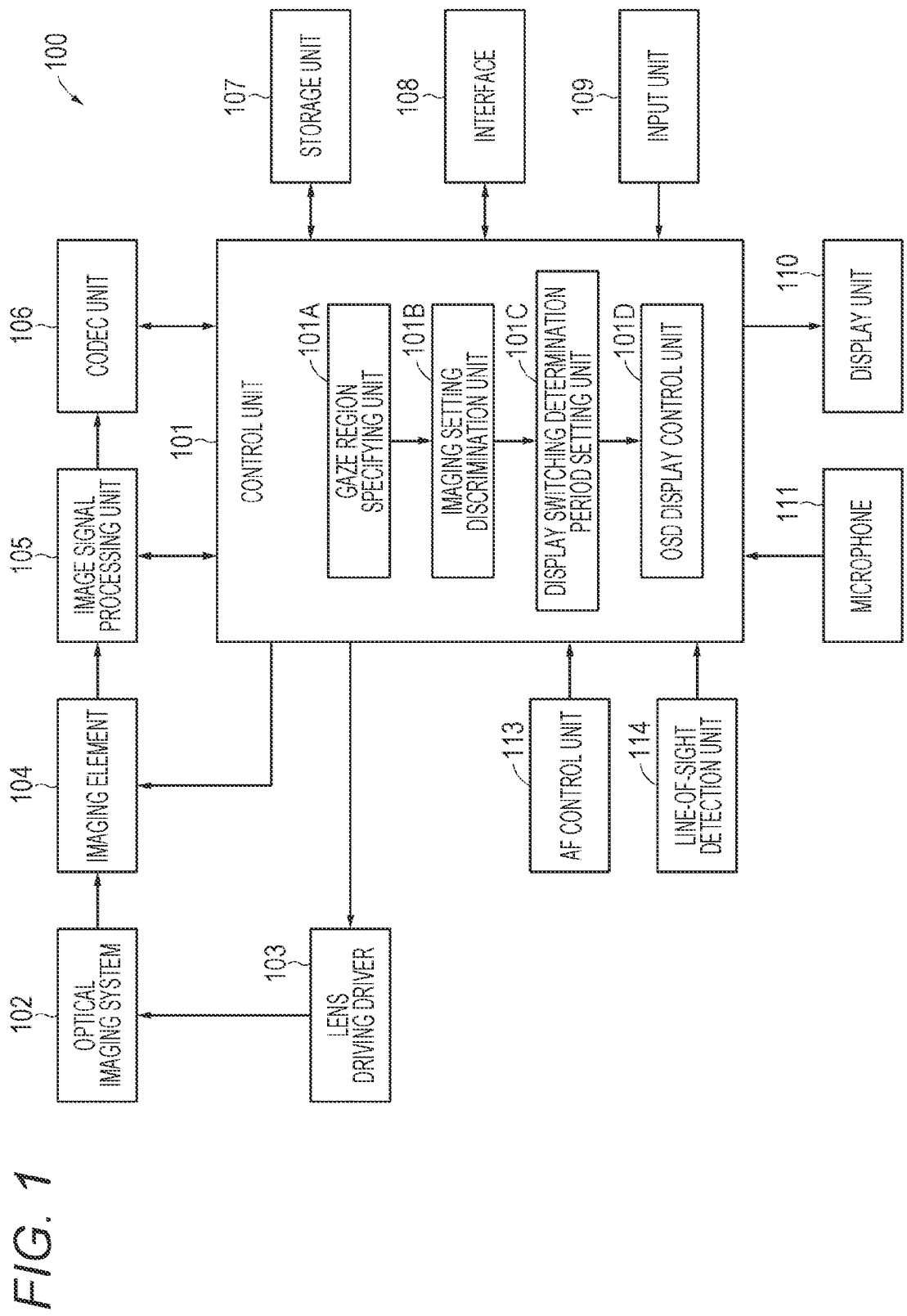
FIG. 1 is a block diagram for describing a configuration example of an imaging device according to an embodiment.

First, a configuration example of an imaging device (imaging device 100) according to the embodiment will be described with reference to FIG. 1. The imaging device 100 includes a control unit 101, an optical imaging system 102, a lens driving driver 103, an imaging element 104, an image signal processing unit 105, a codec unit 106, a storage unit 107, an interface 108, an input unit 109, a display unit 110, a microphone 111, an AF control unit 113, and a line-of-sight detection unit 114. The control unit 101 includes, as functional blocks, a gaze region specifying unit 101A, an imaging setting discrimination unit 101B, a display switching determination period setting unit 101C, and an OSD display control unit 101D.

The control unit 101 includes a central processing unit (CPU), a random access memory (RAM), a read only memory (ROM), and the like. The CPU executes various processes according to a program stored in the ROM to issue commands, thereby comprehensively controlling the entire imaging device 100 and each unit.

The gaze region specifying unit 101A specifies a region (hereinafter, appropriately referred to as a gaze region) that is being gazed at by a user on the basis of line-of-sight information. The imaging setting discrimination unit 101B discriminates an imaging setting related to imaging set in the imaging device 100. In the present embodiment, the imaging setting will be described as an imaging mode. Note that the imaging setting may be content set by the user's input or may be content automatically set. The display switching determination period setting unit 101C sets a display switching determination period for each of a plurality of display items displayed on the display unit 110 in accordance with the set imaging setting related to the imaging. The OSD display control unit 101D performs control related to display of the display item.

The optical imaging system 102 includes an imaging lens configured to collect beams of light from a subject on the imaging element 104, a drive mechanism configured to move the imaging lens to perform focusing and zooming, a shutter mechanism, an iris mechanism, and the like. These are driven on the basis of control signals from the control unit 101 and the lens driving driver 103. An optical image of the subject obtained through the optical imaging system 102 is formed on the imaging element 104.

The lens driving driver 103 includes, for example, a microcomputer or the like, and moves the imaging lens by a predetermined amount along an optical-axis direction on the basis of focus control information supplied from the AF control unit 113 to perform autofocus so as to focus on the subject as a target. The autofocus is performed for focusing on the basis of a defocus amount. At that time, the defocus amount may be calculated from phase difference information based on a pixel value of an image plane phase difference pixel included in the imaging element 104, and the autofocus may be performed on the basis of the calculated defocus amount. Furthermore, focus control is not limited to the autofocus control, and may be manual focus control that is manually performed. Furthermore, operations of the drive mechanism, the shutter mechanism, the iris mechanism, and the like of the optical imaging system 102 are controlled under the control of the control unit 101. Therefore, an exposure time (shutter speed), an aperture value (F-number), and the like are adjusted.

The imaging element 104 photoelectrically converts incident light from the subject obtained through the imaging lens into a charge amount and outputs an imaging signal. Then, the imaging element 104 outputs a pixel signal to the image signal processing unit 105. As the imaging element 104, a charge coupled device (CCD), a complementary metal oxide semiconductor (CMOS), or the like is used.

The image signal processing unit 105 performs sample-and-hold for maintaining a favorable signal/noise (S/N) ratio by correlated double sampling (CDS) processing, auto gain control (AGC) processing, analog/digital (A/D) conversion, and the like on the imaging signal output from the imaging element 104 to create an image signal. Furthermore, the image signal processing unit 105 performs processing for recording on an image signal for recording, and performs processing for display on an image signal for display.

The codec unit 106 performs, for example, encoding processing for recording or communication on the image signal that has been subjected to predetermined processing.

The storage unit 107 is, for example, a mass storage medium such as a hard disk or a flash memory. Video data and image data that has been subjected to processing in the image signal processing unit 105 and the codec unit 106 are stored in a compressed state or an uncompressed state on the basis of a predetermined standard. Furthermore, an exchangeable image file format (EXIF) including additional information such as information regarding the stored data, imaging position information indicating an imaging position, and imaging time information indicating imaging date and time is also stored in association with the data.

The interface 108 is an interface with other devices, the Internet, or the like. The interface 108 may include a wired or wireless communication interface. Furthermore, more specifically, the wired or wireless communication interface may include cellular communication such as 3TTE, Wi-Fi, Bluetooth (registered trademark), near field communication (NFC), Ethernet (registered trademark), High-Definition Multimedia Interface (HDMI) (registered trademark), universal serial bus (USB), and the like.

Note that the imaging device 100 may include a communication unit that can be connected to the Internet, other devices, or the like, such as a wireless local area network (LAN), a wide area network (WAN), or wireless fidelity (WiFi). Furthermore, communication between the imaging device 100 and an external device may be short-range wireless communication such as near field communication (NFC) or ZigBee (registered trademark), or tethering connection such as WiFi tethering, universal serial bus (USB) tethering, or Bluetooth (registered trademark) tethering.

The input unit 109 is used by the user to give various instructions or the like to the imaging device 100. When an input is made to the input unit 109 by the user, a control signal corresponding to the input is generated and supplied to the control unit 101. Then, the control unit 101 performs various processes corresponding to the control signal. Examples of the input unit 109 include a shutter button for shutter input, physical buttons for various operations, a touch panel, a touch screen integrally configured with a display serving as the display unit 110, and the like.

The display unit 110 is a display device such as a display that displays a through image, which is the image signal for display that has been subjected to the processing for display, an image and a video that has been subjected to image processing for recording and stored in the storage unit 107, a graphical user interface (GUI), and the like. The display unit 110 may be included in an electronic viewfinder (EVF). The display items are displayed on the display unit 110.

The microphone 111 is a sound collecting device configured to record a voice at the time of recording an image.

The AF control unit 113 performs the autofocus control on the basis of the defocus amount.

The line-of-sight detection unit 114 detects a line-of-sight of the user to generate a line-of-sight detection result. The generated line-of-sight detection result is supplied from the line-of-sight detection unit 114 to the control unit 101.

[Regarding Line-of-Sight Information and Gaze Region]

Next, a specific example of a process of detecting the line-of-sight of an image-capturing person (user), the process being performed by the line-of-sight detection unit 114 will be described. For example, the line-of-sight detection unit 114 captures an image of an eye of the image-capturing person, and detects a line-of-sight direction of the image-capturing person using the image of the eye.

As a method for detecting the line-of-sight direction of the image-capturing person, a known method can be applied. For example, it is possible to apply a corneal reflection method of emitting infrared light or the like and detecting the line-of-sight direction of the image-capturing person on the basis of a position of a pupil using reflection from a cornea. Furthermore, for example, a method of recognizing a point that does not move such as the inner corner of the eye or the outer corner of the eye by image recognition and estimating the line-of-sight direction from a position of an iris of the eye may be applied.

The line-of-sight detection unit 114 is provided, for example, in a viewfinder of the imaging device 100. The line-of-sight detection unit 114 may be provided in a housing of the imaging device 100. For example, the line-of-sight detection unit 114 may be provided on a surface of the housing of the imaging device 100 on which the display unit 110 is provided.

The line-of-sight direction detected by the line-of-sight detection unit 114 is supplied to the control unit 101 as the line-of-sight detection result.

Figure 2:
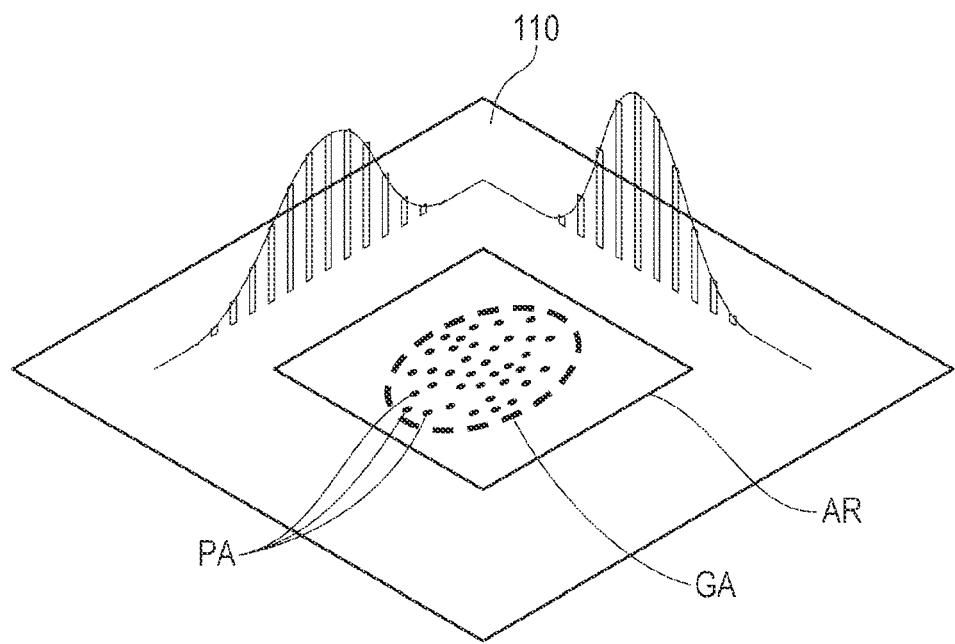
FIG. 2 is a view that is referred to when describing a process of specifying a gaze region.

The gaze region specifying unit 101A of the control unit 101 generates line-of-sight information from the line-of-sight detection result supplied from the line-of-sight detection unit 114. The line-of-sight information is, for example, information indicating a distribution of line-of-sight detection results. Specifically, as illustrated in FIG. 2, the line-of-sight information is a distribution of line-of-sight detection results PA which are locations corresponding to the line-of-sight direction on the display unit 110. The line-of-sight information is obtained for each appropriate region AR of the display unit 110. The region AR may be set on a pixel basis or a block basis, the block including M pixels×N pixels (M and N are appropriate positive numbers). The gaze region specifying unit 101A specifies a region that is being gazed at by the user as the gaze region on the basis of the distribution of the line-of-sight detection results PA. For example, as illustrated in FIG. 2, the gaze region specifying unit 101A obtains a histogram of values (hereinafter, appropriately referred to as gaze degrees) of the distribution of the line-of-sight detection results PA corresponding to both an X-axis direction and a Y-axis direction on the display unit 110, and specifies one or a plurality of regions AR corresponding to a peak as a gaze region GA. Furthermore, the gaze region specifying unit 101A may obtain a variance value for each point obtained by dividing the histogram with a predetermined resolution and specify a region where the variance value is equal to or greater than a threshold as the gaze region GA. Furthermore, an area of the gaze region may be defined as a predetermined value, and a region having an area of the predetermined value from a region where the gaze degree is high may be set as the gaze region GA. Furthermore, a region where the gaze degree is equal to or greater than a threshold may be set as the gaze region GA.

Note that the line-of-sight information may be information indicating a trajectory of the line-of-sight detection results PA. For example, in a case where the trajectory of the line-of-sight detection results PA falls within a certain region within a predetermined time of about several seconds, the gaze region specifying unit 101A may specify the region as the gaze region GA.

In general, display positions at which the display items are displayed on the display unit 110 are determined respectively for the display items. Thus, in a case where an overlap between the gaze region GA specified by the gaze region specifying unit 101A and a display position (certain region) of a display item is equal to or greater than a threshold (for example, 80%), it can be determined that the image-capturing person is gazing at the display item, in other words, the line-of-sight coincides with the display item.

[Regarding Display Switching Determination Period]

Next, the display switching determination period set by the display switching determination period setting unit 101C will be described. The display switching determination period setting unit 101C sets the display switching determination period for each of the plurality of display items in accordance with relevance between the imaging mode and the display item. The relevance is an index indicating strength of the relation between the imaging mode and the display item. The relevance is set, for example, for each of the display items. The relevance according to the present embodiment is "high", "medium", and "low" in descending order of the relevance, and each relevance is sorted in accordance with a predetermined threshold. Each of the display items is classified for the corresponding relevance on the basis of the threshold for the relevance and relevance set to the display item itself.

The display switching determination period means a period in which the user continuously views a display item since the start of viewing. In other words, it is determined whether or not the line-of-sight detection unit 114 has continuously detected the line-of-sight of the user with respect to the display item during the display switching determination period, and the display of the display item is controlled to a high-visibility display state that is display with higher visibility if a result of the determination is that the detection has been continued and controlled to a low-visibility display state that is display with lower visibility if a result of the determination is that the detection has not been continued. Furthermore, the control unit 101 determines whether or not the detection of the line-of-sight of the user for the display item described above has been continued. The display switching determination period according to the present embodiment includes: a high-visibility display state switching determination period TA for setting the display of the display item to the high-visibility display state that is a display state with higher visibility; and a low-visibility display state switching determination period TB for setting the display of the display item to the low-visibility display state that is a display state with lower visibility than that of the high-visibility display state. The display switching determination period setting unit 101C sets different display switching determination periods between the high-visibility display state switching determination period TA and the low-visibility display state switching determination period TB for each of the plurality of display items in accordance with the relevance.

FIG. 3 is a view illustrating an example of the display switching determination period (specifically, the high-visibility display state switching determination period TA and the low-visibility display state switching determination period TB) set for each of the plurality of display items in accordance with the relevance between the imaging mode and the display item. In the example illustrated in FIG. 3, "A mode (aperture priority mode)", "S mode (shutter speed priority mode)", and "M mode (manual mode)" are illustrated as the imaging modes. Furthermore, in the example illustrated in FIG. 3, "Shutter speed (hereinafter, appropriately abbreviated as SS)", "F-number", "Exposure", "White balance (hereinafter, appropriately abbreviated as WB)", "ISO sensitivity (hereinafter, appropriately abbreviated as ISO)", "Imaging mode", "Number of images that can be captured", "Aspect ratio", "Image size", "Image quality", and "Remaining battery level" are illustrated as display items.

For example, in a case where the imaging mode is "S mode", the display item "SS" is classified for the relevance "high". The display items "F-number", "Exposure", "WB", and "ISO" are classified for the relevance "medium". The display items "Mode", "Aspect ratio", "Image quality", and "Battery" are classified for the relevance "low". The imaging modes "A mode" and "M mode" are sorted as illustrated in FIG. 3.

In the present embodiment, in a case where a display item having high relevance to a set imaging mode has been gazed at, the display item is controlled to be quickly displayed in the high-visibility display state. Furthermore, even in a case where a display item having high relevance to the set imaging mode is not gazed at, the display item is controlled not to be displayed in the low-visibility display state for a certain period of time. Therefore, it is possible to immediately highlight a display item having high relevance to a predetermined imaging mode, in other words, the display item that is considered to have setting content that is frequently checked by the image-capturing person. Furthermore, the display item that is considered to be frequently checked by the image-capturing person can be prevented from being immediately displayed in the low-visibility display state and becoming difficult to see.

On the other hand, as the relevance to the set imaging mode decreases, the need for the image-capturing person to check setting content of a display item decreases, and the need to quickly display the display item in the high-visibility display state decreases. Furthermore, the need to quickly display the display item in the low-visibility display state increases since the need for the image-capturing person to check the setting content of the display item decreases. This control can prevent a display item having low relevance to the set imaging mode from being unnecessarily displayed in the high-visibility display state or the display item from being displayed unnecessarily long.

On the basis of such a viewpoint, the display switching determination period setting unit 101C sets the high-visibility display state switching determination period TA to a smaller value than that of the low-visibility display state switching determination period TB for a display item whose relevance is equal to or greater than the threshold. In the example illustrated in FIG. 3, the high-visibility display state switching determination period TA of the display item sorted as the relevance "high" is set to 0.2 seconds, and the low-visibility display state switching determination period TB of the display item sorted as the relevance "high" is set to 3 seconds. Furthermore, the high-visibility display state switching determination period TA of the display item sorted as the relevance "medium" is set to 0.5 seconds, and the low-visibility display state switching determination period TB of the display item sorted as the relevance "medium" is set to 2 seconds.

Furthermore, the display switching determination period setting unit 101C sets a high-visibility display state switching determination period to a larger value than that of a low-visibility display state switching determination period for a display item whose relevance is less than the threshold. In the example illustrated in FIG. 3, the high-visibility display state switching determination period TA of the display item sorted as the relevance "low" is set to 1 second, and the low-visibility display state switching determination period TB of the display item sorted as the relevance "low" is set to 0.7 seconds.

[Regarding Specific Examples of Display Control]

Figure 4:
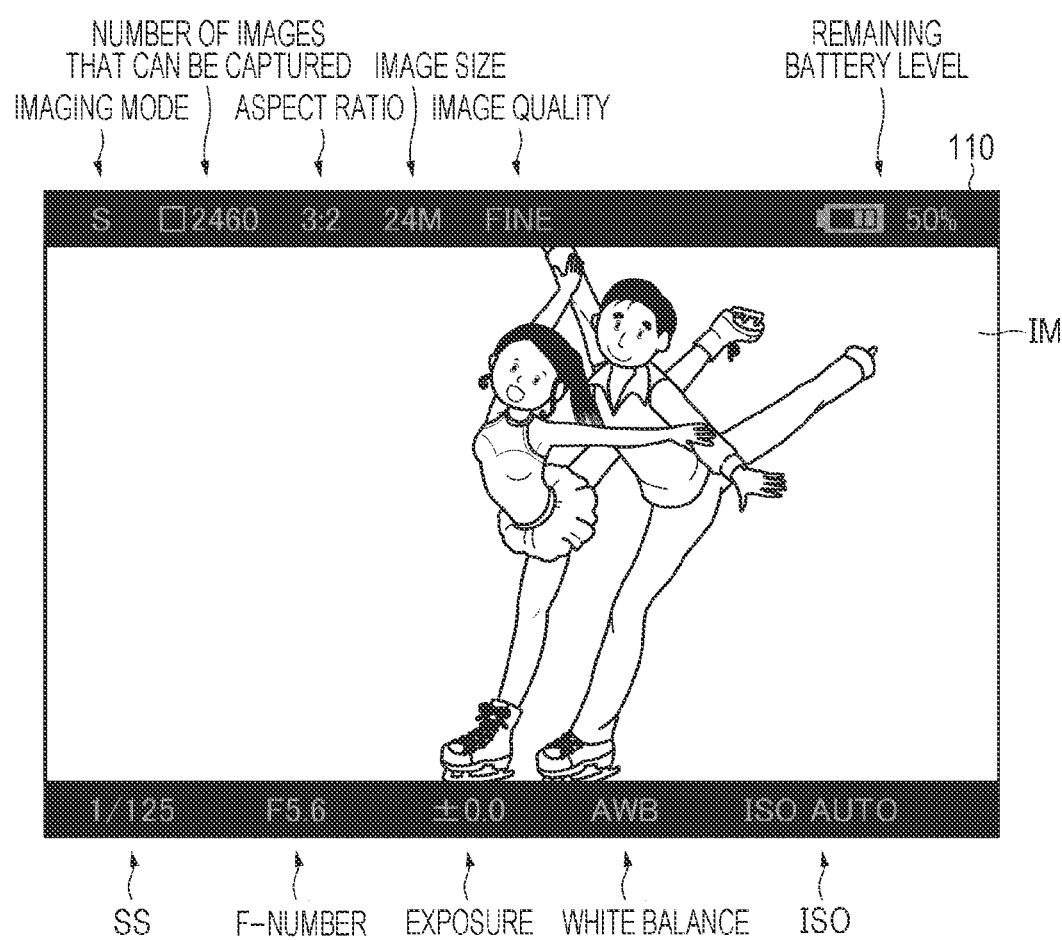
FIG. 4 is a view that is referred to when describing display control according to the embodiment.

Next, a specific example regarding display control of the display item performed by the OSD display control unit 101D will be described. FIG. 4 is a view illustrating an example of an image displayed on the display unit 110. The display unit 110 displays an image taken via the optical imaging system 102, the imaging element 104, and the like. In the present example, an image IM including two skate players is displayed on the display unit 110.

Each black strip extending in the lateral direction is displayed at the top and the bottom of the display unit 110, and the display items are displayed at these locations. For example, in the upper black strip, the display items "Imaging mode (for example, S)", "Number of images that can be captured (for example, □2460)", "Aspect ratio (for example, 3:2)", "Image size (for example, 24 M)", "Image quality (for example, FINE)", and "Remaining battery level (for example, a battery mark and 50%)" are displayed in order from the left. Furthermore, in the lower black strip, the display items "SS (for example, 1/125)", "F-number (for example, F5.6)", "Exposure (for example, ±0.0)", "WB (for example, AWB (auto white balance)", and "ISO (for example, AUTO)" are displayed in order from the left.

In a default display state, each of the display items is displayed, for example, in a mode with transparency to a degree that can be visually recognized by the image-capturing person, specifically, a translucent mode. For example, an α value (transmittance) in image processing, called α blending, is set to about 40 to 60%, and then, each of the display items is displayed on the display unit 110 by OSD. In the following description, a display state illustrated in FIG. 4 is appropriately referred to as the default display state.

Figure 5:
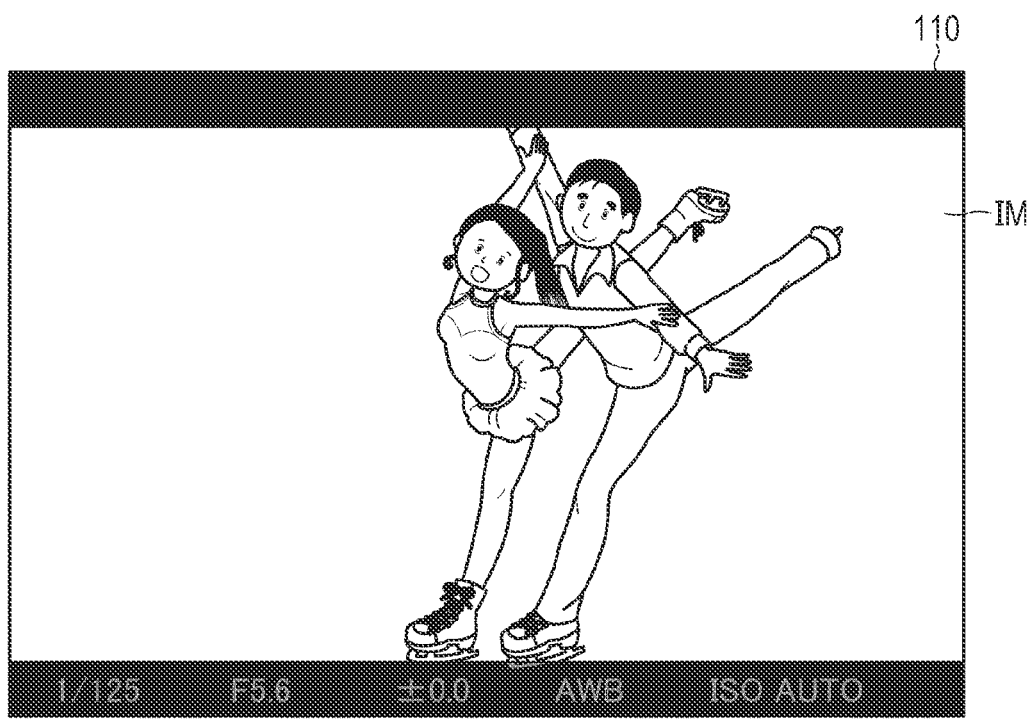
FIG. 5 is a view that is referred to when describing the display control according to the embodiment.

An example in which it is detected that the image-capturing person is viewing the image IM on the basis of the line-of-sight detection result of the line-of-sight detection unit 114 will be considered. In this case, a state is obtained in which not all the display items are gazed and a line-of-sight of the image-capturing person with respect to the display items is not continuously detected. In this state, the OSD display control unit 101D displays each of the display items classified into the relevance "low" quickly in the low-visibility display state. For example, at a time point when the low-visibility display state switching determination period TB (0.7 seconds) set for the display items with the relevance "low" has elapsed, the OSD display control unit 101D displays each of the display items in the low-visibility display state. Specifically, for example, the OSD display control unit 101D sets the α value in the α blending to 100 and displays each of the display items. Therefore, each of the display items classified into the relevance "low" displayed in the upper black strip becomes invisible as illustrated in FIG. 5.

Figure 6:
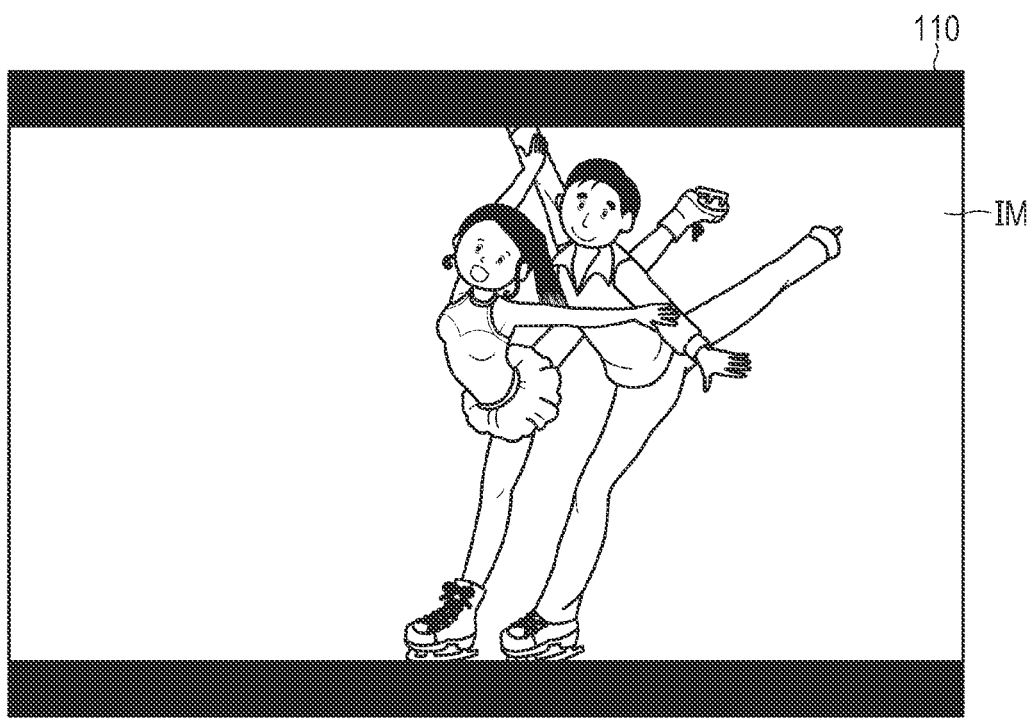
FIG. 6 is a view that is referred to when describing the display control according to the embodiment.

Moreover, when the low-visibility display state switching determination period TB (2 seconds) set to the display item with the relevance "medium" elapses in a state where any of the display items is not gazed at, the OSD display control unit 101D performs control such that the display items "F-number", "Exposure", "WB", and "ISO" are invisible. Moreover, when the low-visibility display state switching determination period TB (3 seconds) set to the display item with the relevance "high" elapses in a state where any of the display items is not gazed at, the OSD display control unit 101D performs control such that the display items "SS" is invisible. Therefore, all the display items become invisible as illustrated in FIG. 6. Note that the control may be performed such that upper and lower black strips become invisible in FIG. 6.

Figure 7:
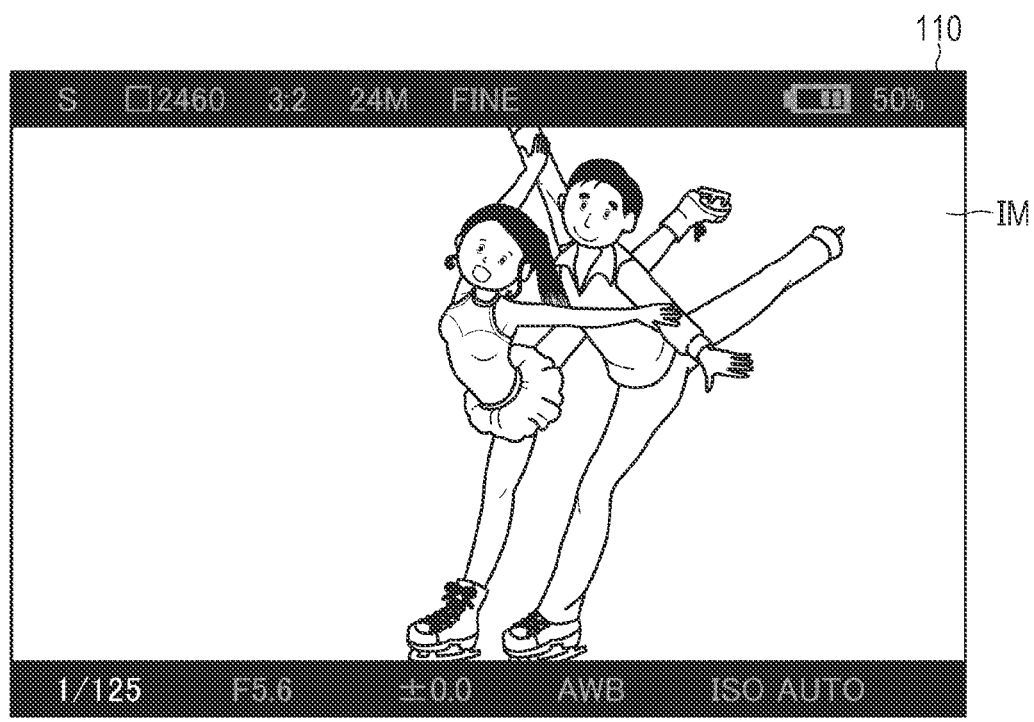
FIG. 7 is a view that is referred to when describing the display control according to the embodiment.

Furthermore, for example, it is assumed that the image-capturing person is gazing at a position where the display item "SS" is displayed in the default display state in FIG. 4. That is, it is assumed that the line-of-sight of the image-capturing person has been continuously detected with respect to display of the display item "SS". Note that the expression "with respect to display" means with respect to a display position. The OSD display control unit 101D displays the display item "SS" in the high-visibility display state at a time point when the gaze state has continued for the high-visibility display state switching determination period TA (0.2 seconds) corresponding to the display item "SS". For example, the OSD display control unit 101D sets the α value to 0, and controls the display item "SS" to be more easily visible than the other display items as illustrated in FIG. 7. This similarly applies to the other display items. That is, the OSD display control unit 101D performs control to display the gazed display item in the high-visibility display state for the high-visibility display state switching determination period TA.

Note that the OSD display control unit 101D immediately changes the display of the display item to the high-visibility display state after the lapse of the high-visibility display state switching determination period TA. For example, in a case where the α value of the default display state is set to 50, the OSD display control unit 101D immediately changes the α value from 50 to 0 after the lapse of the high-visibility display state switching determination period TA, thereby displaying the display item in the high-visibility display state as illustrated in FIG. 8A. Furthermore, the OSD display control unit 101D may gradually change the display of the display item to the high-visibility display state after the lapse of the high-visibility display state switching determination period TA. For example, in the case where the α value in the default display state is set to 50, the OSD display control unit 101D may display the display item in the high-visibility display state by gradually (linearly) changing the α value from 50 to 0 after the lapse of the high-visibility display state switching determination period TA as illustrated in FIG. 8B. The degree of fade-in (degree of change of the α value) and time thereof can be appropriately set. Furthermore, the change of the α value is not necessarily linear but may be exponential or stepwise. Note that, in the examples illustrated in FIGS. 8A and 8B, the display state has the lowest visibility when the α value=100, and the display state has the highest visibility when the α value=0

This similarly applies to a transition from the default display state to the low-visibility display state. The OSD display control unit 101D immediately changes the display of the display item to the low-visibility display state after the lapse of the low-visibility display state switching determination period TB. For example, in a case where the α value of the default display state is set to 50, the OSD display control unit 101D immediately changes the α value from 50 to 100 after the lapse of the low-visibility display state switching determination period TB, thereby displaying the display item in the low-visibility display state as illustrated in FIG. 8C. Furthermore, the OSD display control unit 101D may gradually change the display of the display item to the low-visibility display state after the lapse of the low-visibility display state switching determination period TB. For example, in the case where the α value in the default display state is set to 50, the OSD display control unit 101D may display the display item in the high-visibility display state by gradually (linearly) changing the α value from 50 to 100 after the lapse of the low-visibility display state switching determination period TB as illustrated in FIG. 8D. The degree of fade-out (degree of change of the α value) and time thereof can be appropriately set. Furthermore, the change of the α value is not necessarily linear but may be exponential or stepwise.

[Flow of Processing]

Figure 9:
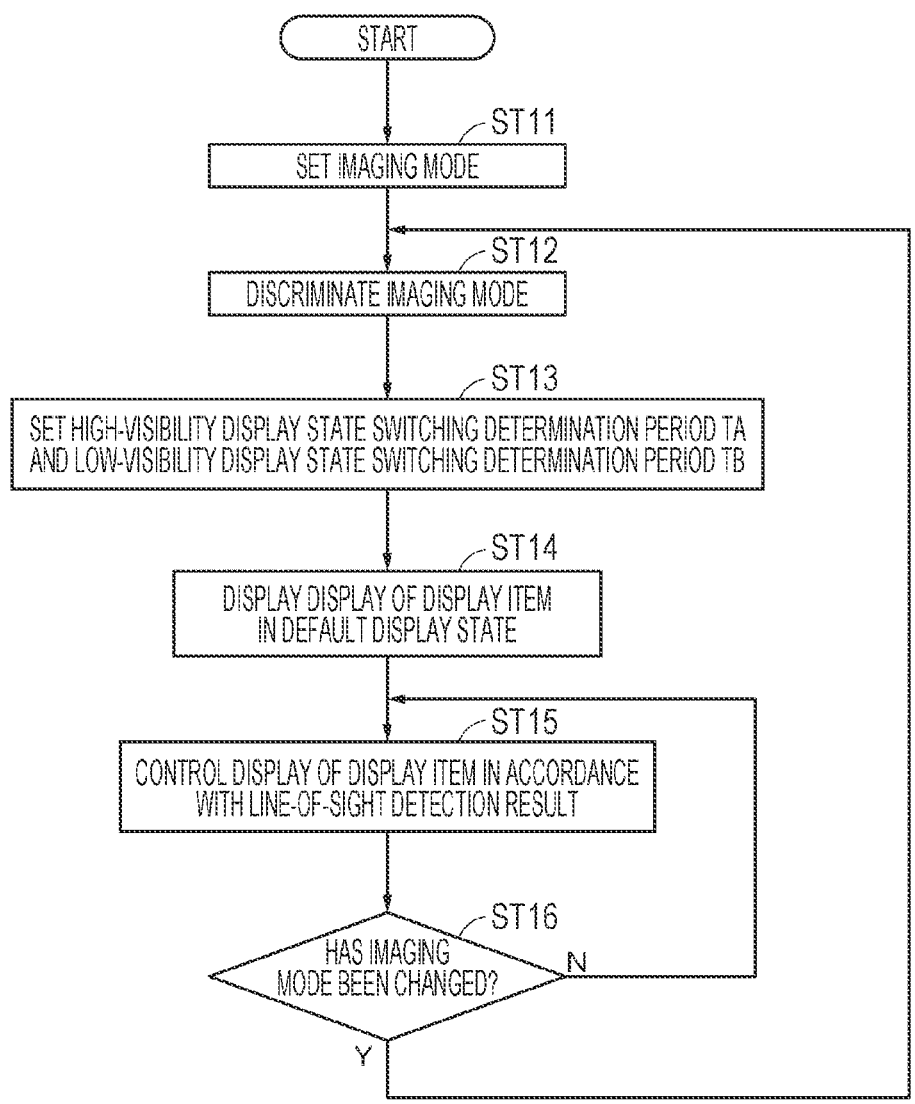
FIG. 9 is a flowchart illustrating a flow of processing performed by the imaging device according to the embodiment.

Next, a flow of processing (flow of schematic processing) performed by the imaging device 100 according to the embodiment will be described with reference to a flowchart illustrated in FIG. 9. The following processing is performed, for example, when the power of the imaging device 100 is turned on or when the line-of-sight of the image-capturing person is detected. Note that it is assumed that the gaze region is specified in real time on the basis of the line-of-sight detection result of the image-capturing person obtained by the line-of-sight detection unit 114 although not illustrated in the flowchart illustrated in FIG. 9.

In step ST11, the imaging mode is set. For example, the image-capturing person sets the imaging mode using the input unit 109. Note that the process of step ST11 is omitted in a case where the previously set imaging mode is not changed. Then, the processing proceeds to step ST12.

In step ST12, the imaging setting discrimination unit 101B discriminates the set imaging mode. The imaging setting discrimination unit 101B notifies the display switching determination period setting unit 101C of the discriminated imaging mode. Then, the processing proceeds to step ST13.

In step ST13, the display switching determination period setting unit 101C sets the high-visibility display state switching determination period TA and the low-visibility display state switching determination period TB for each of the display items in accordance with the relevance to the discriminated imaging mode. Then, the processing proceeds to step ST14.

In step ST14, the display items are displayed in the default display state under the control of the OSD display control unit 101D. Then, the processing proceeds to step ST15.

In step ST15, the OSD display control unit 101D controls display of the display items in accordance with the detection result of the line-of-sight of the image-capturing person. Then, the processing proceeds to step ST16.

In step ST16, the imaging setting discrimination unit 101B discriminates whether or not the imaging mode has been changed. Such determination processing according to step ST16 is performed, for example, in parallel with the processing of step ST15. In a case where the imaging mode has not been changed, the processing according to step ST15 is repeated. In a case where the imaging mode has been changed, the processing returns to step ST12, and the changed imaging mode is discriminated. Then, the high-visibility display state switching determination period TA and the low-visibility display state switching determination period TB are set for each of the display items in accordance with the changed imaging mode.

Figure 10:
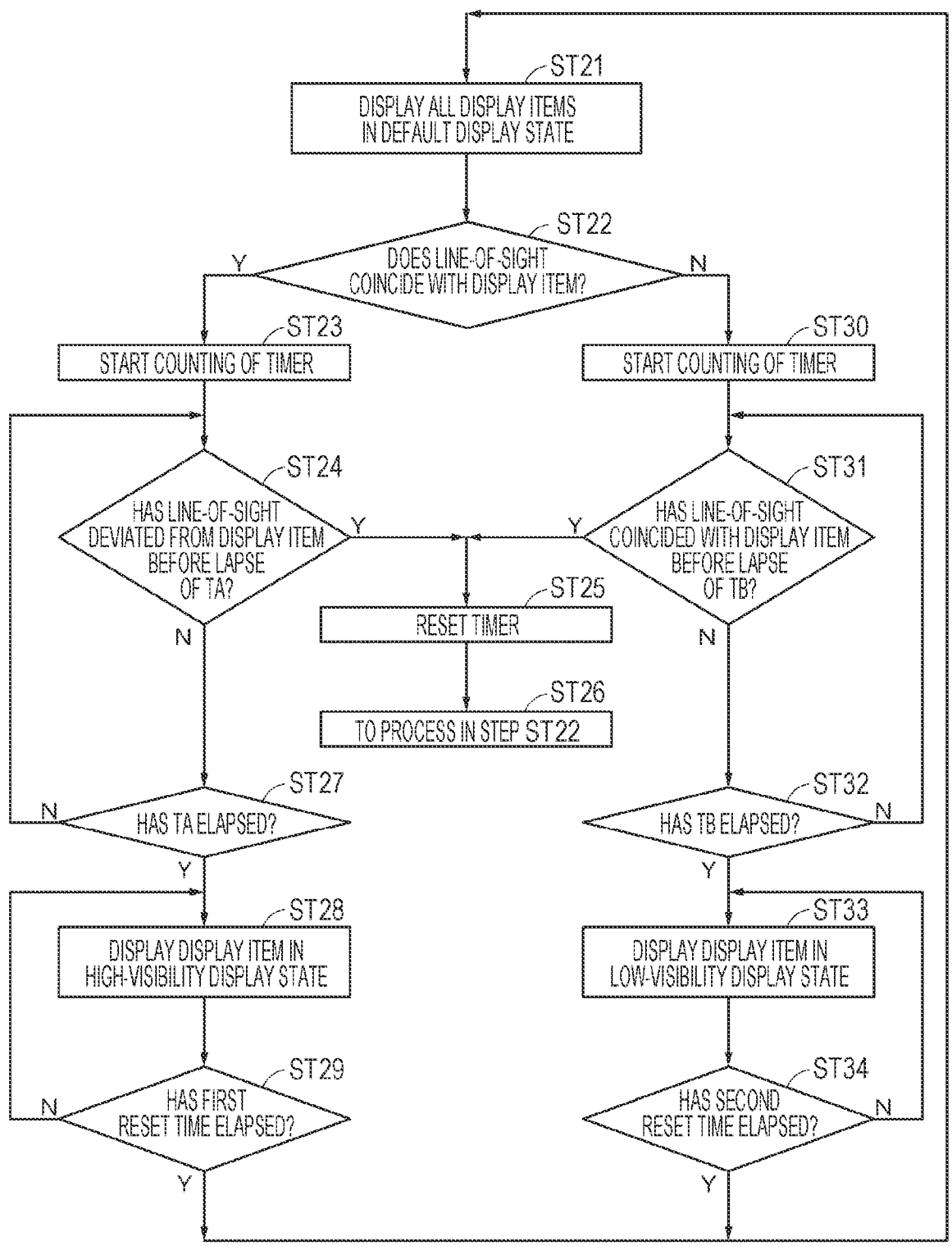
FIG. 10 is a flowchart illustrating the flow of the processing performed by the imaging device according to the embodiment.

Next, a flow of specific processing related to the control of the display of the display items will be described with reference to a flowchart of FIG. 10.

Step ST21 is a process corresponding to step ST14 described above. In step ST21, all the display items are displayed in the default display state. Then, the processing proceeds to step ST22.

In step ST22, the control unit 101 determines whether or not the line-of-sight of the image-capturing person coincides with a predetermined display item displayed on the display unit 110 on the basis of the gaze region specified by the gaze region specifying unit 101A. In a case where the line-of-sight coincides, the processing proceeds to step ST23.

In step ST23, counting of a timer is started. The timer is, for example, a timer provided in the control unit 101. Then, the processing proceeds to step ST24.

In step ST24, the control unit 101 determines whether or not the line-of-sight of the image-capturing person coinciding with the predetermined display item has deviated before the high-visibility display state switching determination period TA (the high-visibility display state switching determination period TA corresponding to the display item with which the line-of-sight coincides) elapses on the basis of the gaze region specified by the gaze region specifying unit 101A. In a case where the line-of-sight has deviated, the processing proceeds to step ST25.

In step ST25, a count value of the timer is reset. Then, the processing proceeds to step ST26. In step ST26, control is performed to return the processing to step ST22.

In a case where the line-of-sight has not deviated from the predetermined display item in the determination processing of step ST24, the processing proceeds to step ST27. In step ST27, the control unit 101 determines whether or not the high-visibility display state switching determination period TA has elapsed. In a case where the high-visibility display state switching determination period TA has not elapsed, the processing returns to step ST24. In a case where the high-visibility display state switching determination period TA has elapsed, the processing proceeds to step ST28.

In step ST28, the OSD display control unit 101D performs control to display the display item in the high-visibility display state. Then, the processing proceeds to step ST29.

In step ST29, the control unit 101 determines whether or not a first reset time has elapsed. The first reset time is a time set for returning from the high-visibility display state to the default display state, and is set to, for example, about several seconds. In a case where the first reset time has not elapsed, the processing returns to step ST28, and the display of the display item in the high-visibility display state is continued. In a case where the first reset time has elapsed, the processing returns to step ST21, and all display items are displayed in the default display state.

In a case where the line-of-sight of the image-capturing person has not coincided with all the display items displayed on the display unit 110 in the determination processing of step ST22, the processing proceeds to step ST30.

In step ST30, counting of the timer is started. The timer is, for example, a timer provided in the control unit 101. Then, the processing proceeds to step ST31.

In step ST31, the control unit 101 determines whether or not the line-of-sight of the image-capturing person coincides with the predetermined display item before the low-visibility display state switching determination period TB elapses on the basis of the gaze region specified by the gaze region specifying unit 101A. In a case where the line-of-sights coincides, the processing proceeds to step ST25.

In step ST25, a count value of the timer is reset. Then, the processing proceeds to step ST26. In step ST26, control is performed to return the processing to step ST22.

In a case where the line-of-sight does not coincide with the predetermined display item in the determination processing of step ST31, the processing proceeds to step ST32. In step ST32, the control unit 101 determines whether or not the low-visibility display state switching determination period TB has elapsed for each of the display items. In a case where the low-visibility display state switching determination period TB has not elapsed, the processing returns to step ST31. In a case where the low-visibility display state switching determination period TB has elapsed, the processing proceeds to step ST33.

In step ST33, the OSD display control unit 101D performs control to display the display item in the low-visibility display state. Then, the processing proceeds to step ST34.

In step ST34, the control unit 101 determines whether or not a second reset time has elapsed. The second reset time in this process is a time set for returning the display state to the default display state in a case where the duration in which all the display items are displayed in the low-visibility display state becomes equal to or longer than a certain value, and is set to, for example, about 1 minute to several minutes. The second reset time is set since there is a possibility that the image-capturing person checks content of the display items again after a lapse of a certain period of time in a case where all the display items have been displayed in the low-visibility display state. In a case where the second reset time has not elapsed, the processing returns to step ST33, and the display of the display items in the low-visibility display state is continued. In a case where the second reset time has elapsed, the processing returns to step ST21, and all display items are displayed in the default display state.

Figure 11:
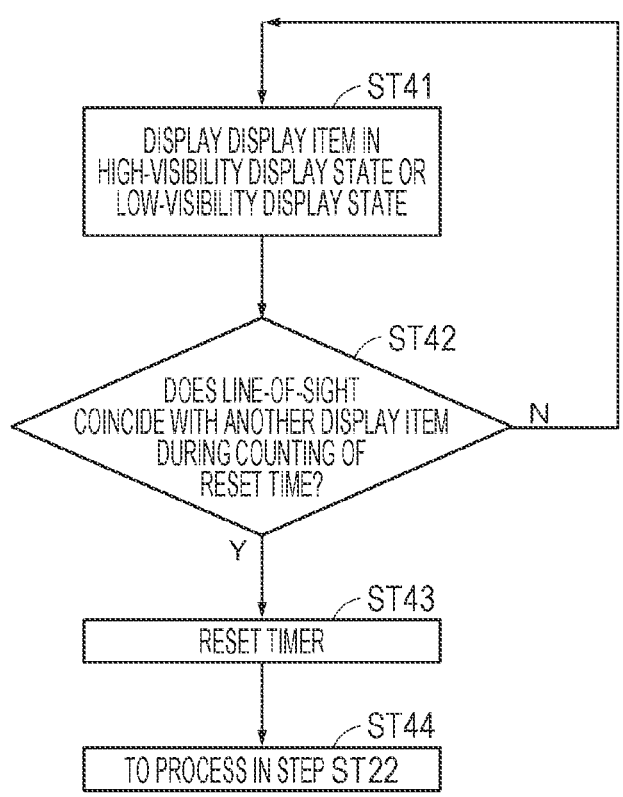
FIG. 11 is a flowchart illustrating the flow of the processing performed by the imaging device according to the embodiment.

Note that the processing illustrated in the flowchart of FIG. 11 is performed in parallel with the counting processing of the first reset time or the second reset time. In step ST41, the OSD display control unit 101D displays a display item in the high-visibility display state or the low-visibility display state. Such processing is processing corresponding to step ST28 or step ST33 described above. Then, the processing proceeds to step ST42.

In step ST42, the control unit 101 determines whether or not the line-of-sight coincides with another display item during the reset time counting. Examples of the another display item include a display item different from the display item displayed in the high-visibility display state, a display item displayed in the default display state, and the like. In a case where the line-of-sight does not coincide with the display item, the processing returns to step ST41. In a case where the line-of-sight coincides with the display item, the processing proceeds to step ST43.

The processes after step ST43 are performed in an interruptive manner. In step ST43, a process of resetting the timer is performed. Then, the processing proceeds to step ST44. In step ST44, a process of returning the content of the processing to step ST22 is performed.

According to the present embodiment described above, the display control of the display item can be performed in accordance with the imaging mode set in the imaging device. Therefore, the display item that is considered to be often required by the image-capturing person can be immediately brought into the high-visibility display state. Furthermore, the display item can be prevented from immediately disappearing from the screen. Furthermore, the display item that is considered to be unnecessary for the image-capturing person can be immediately set to the low-visibility display state.

<Modified Examples>

Although the embodiment of the present disclosure has been specifically described above, the content of the present disclosure is not limited to the above-described embodiment, and various modified examples based on the technical idea of the present disclosure are possible.

[First Modified Example]

Figure 12:
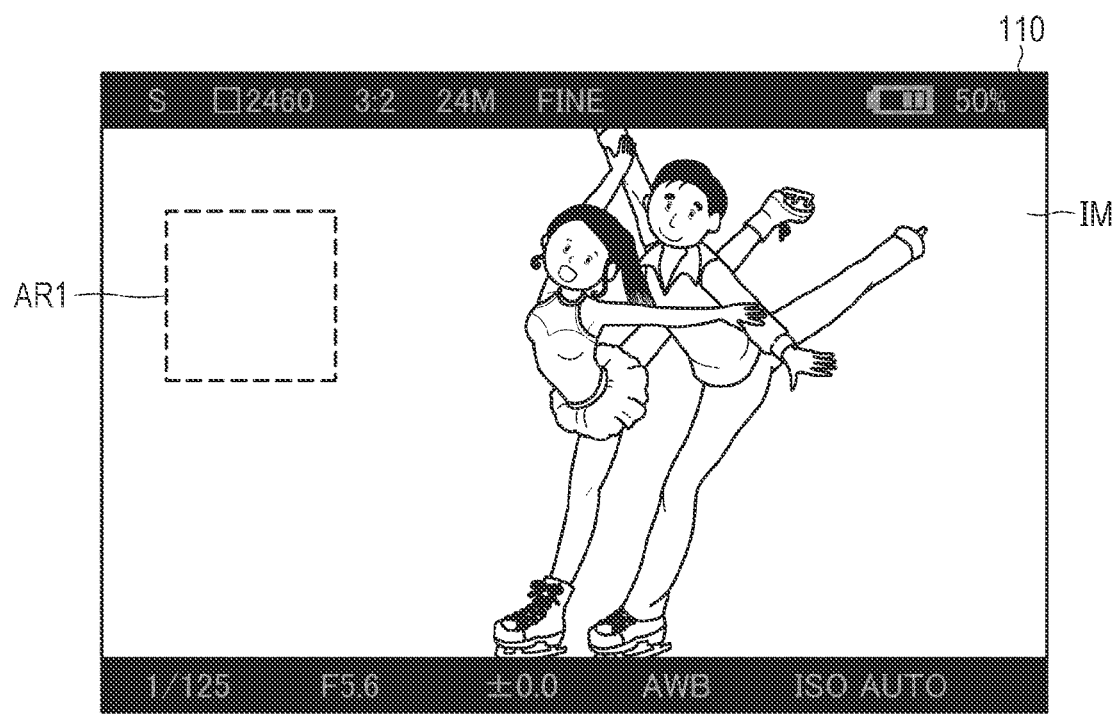
FIG. 12 is a view for describing a modified example.
Figure 13:
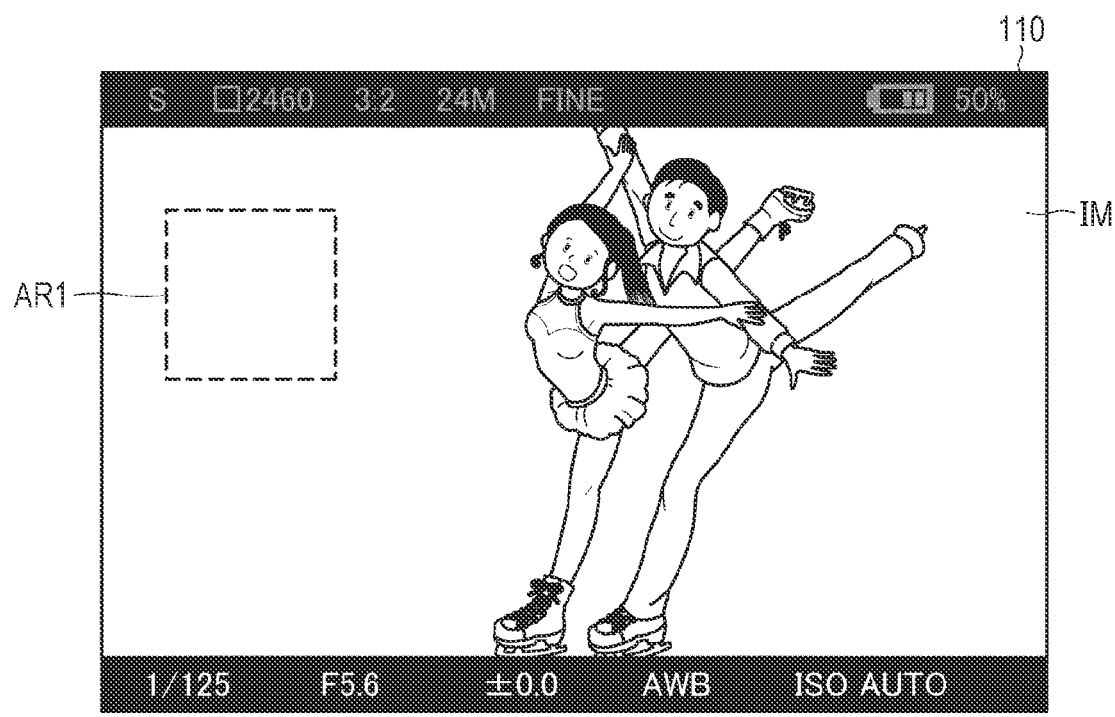
FIG. 13 is a view for describing the modified example.

For example, the display items classified into the relevance "high" may be collectively displayed in the high-visibility display state in a case where a predetermined portion has been gazed at and the high-visibility display state switching determination period TA has elapsed. For example, as illustrated in FIG. 12, the image-capturing person gazes at a predetermined region AR1 of the display unit 110. In a case where a period of the gaze exceeds the high-visibility display state switching determination period TA, the OSD display control unit 101D may perform control to display all the display items having the relevance "high" with the imaging mode in the high-visibility display state as illustrated in FIG. 13. Note that a frame or a mark may be displayed in the region AR1 so as to be identifiable by the image-capturing person. Furthermore, the region AR1 may be a region provided in the housing of the imaging device 100 instead of the display unit 110. Furthermore, in a case where one of the display items having the relevance "high" has been gazed at, the other display items having the relevance "high" may also be set in the high-visibility display state together.

[Second Modified Example]

The imaging setting is not limited to the imaging mode, and may relate, for example, to an imaging situation. Examples of the imaging situation include "Sports", "Portrait", "Still life", "landscape", "night scene", and "food". In the case of the imaging situation as well, each of the display items is similarly classified into the relevance to the imaging situation of "high", "medium", or "low". Then, the high-visibility display state switching determination period TA and the low-visibility display state switching determination period TB are set for each relevance. FIG. 14 is a view illustrating an example of the high-visibility display state switching determination period TA and the low-visibility display state switching determination period TB set for each of the display items classified in accordance with the relevance to the imaging situation and each relevance. Note that content of the imaging situation is discriminated by the imaging setting discrimination unit 101B.

[Other Modified Examples]

Figure 15:
FIG. 15 is a view for describing the modified example.

As illustrated in FIG. 15, the display items may be displayed to be superimposed on an image without being limited to the top and bottom of the display unit 110.

The relevance may be set with other than three stages. Furthermore, the display state switching determination period is not limited to two stages of high and low, and either one may be set, or periods with three or more stages may be set.

The relevance of each of the display items may be dynamically changed in accordance with a use history of the user. For example, in a case where there are many opportunities to gaze at the display item "Image quality", the relevance of "Image quality" may be changed to be high.

The default display state may be other than translucent. The display mode of the high-visibility display state can also be changed as appropriate. For example, the high-visibility display state may be a display mode in which the display item is set to blink or the display item is displayed in a larger size. The display mode of the low-visibility display state can also be changed as appropriate. For example, the low-visibility display state may be a display mode in which the display item is displayed in a smaller size.

A position of each of the display items may be changed and set in accordance with a habit of the image-capturing person to direct his/her own line-of-sight, or the like.

A general-purpose operation input unit configured to change the setting content of the display item may be provided. Then, a setting related to the display item that has been set to the high-visibility display state due to the gaze may be changed by operating the operation input unit. Furthermore, the setting related to the display item that has been set to the high-visibility display state may be changed by voice input.

The configurations, methods, steps, shapes, materials, numerical values, and the like described in the above-described embodiment and modified examples are merely examples, and configurations, methods, steps, shapes, materials, numerical values, and the like different from those described above may be used as necessary or replacement with known ones is also possible. Furthermore, the configurations, methods, steps, shapes, materials, numerical values, and the like in the embodiment and the modified examples can be combined with each other within a range in which no technical contradiction occurs.

Note that the content of the present disclosure is not to be construed as being limited by the effects exemplified in the present specification.

The present disclosure can also adopt the following configurations.

(1)

An imaging device including a display switching determination period setting unit that sets a display switching determination period for each of a plurality of display items displayed on a display unit in accordance with a set imaging setting related to imaging.

(2)

The imaging device according to (1), in which the display switching determination period setting unit sets the display switching determination period for each of the plurality of display items in accordance with relevance between the imaging setting and the display item.

(3)

The imaging device according to (2), in which the display switching determination period includes a high-visibility display state switching determination period for setting display of the display item to a high-visibility display state that is a display state with higher visibility, and a low-visibility display state switching determination period for setting the display of the display item to a low-visibility display state that is a display state with lower visibility than the high-visibility display state, and the display switching determination period setting unit sets different display switching determination periods between the high-visibility display state switching determination period and the low-visibility display state switching determination period for each of the plurality of display items in accordance with the relevance.

(4)

The imaging device according to (3), in which the display switching determination period setting unit sets the high-visibility display state switching determination period to a smaller value than a value of the low-visibility display state switching determination period for the display item having the relevance equal to or greater than a threshold.

(5)

The imaging device according to (3) or (4), in which the display switching determination period setting unit sets the high-visibility display state switching determination period to a larger value than a value of the low-visibility display state switching determination period for the display item having the relevance less than a threshold.

(6)

The imaging device according to any one of (3) to (5), further including a line-of-sight detection unit and an OSD display control unit, in which the OSD display control unit controls display of the display item in accordance with whether or not the line-of-sight detection unit has continuously detected a line-of-sight of a user with respect to a display position of the display item over the display switching determination period.

(7)

The imaging device according to (6), in which the OSD display control unit changes the display of the display item to the high-visibility display state in a case where the line-of-sight detection unit has continuously detected the line-of-sight of the user with respect to the display of the display item over the high-visibility display state switching determination period.

(8)

The imaging device according to (7), in which the OSD display control unit immediately changes the display of the display item to the high-visibility display state after the high-visibility display state switching determination period elapses.

(9)

The imaging device according to (7), in which the OSD display control unit gradually changes the display of the display item to the high-visibility display state after the high-visibility display state switching determination period elapses.

(10)

The imaging device according to (6) to (9), in which the OSD display control unit changes the display of the display item to the low-visibility display state in a case where the line-of-sight detection unit has not continuously detected the line-of-sight of the user with respect to the display item over the low-visibility display state switching determination period.

(11)

The imaging device according to (10), in which the OSD display control unit immediately changes the display of the display item to the low-visibility display state after the low-visibility display state switching determination period elapses.

(12)

The imaging device according to (10), in which the OSD display control unit gradually changes the display of the display item to the low-visibility display state after the low-visibility display state switching determination period elapses.

(13)

A method for controlling an imaging device, the method including setting, by a display switching determination period setting unit, a display switching determination period for each of a plurality of display items displayed on a display unit in accordance with a set imaging setting related to imaging.

(14)

A program for causing a computer to execute a method for controlling an imaging device, the method including setting, by a display switching determination period setting unit, a display switching determination period for each of a plurality of display items displayed on a display unit in accordance with a set imaging setting related to imaging.

(15)

The imaging device according to (6), in which the display of the display item is a display position of the display item.

REFERENCE SIGNS LIST

100 Imaging device
101 Control unit
101A gaze region specifying unit
101B Imaging setting discrimination unit
101C Display switching determination period setting unit
101D OSD display control unit
114 Line-of-sight detection unit

The invention claimed is:

1. An imaging device comprising: a memory configured to store program code, and a processor configured to execute the program code to perform operations comprising: setting a display switching determination period for each of a plurality of display items displayed on a display in accordance with a set imaging setting related to imaging, wherein the display switching determination period is set for each of the plurality of display items in accordance with a relevance between the imaging setting and the display item, wherein the display switching determination period includes a high-visibility display state switching determination period for setting display of the display item to a high-visibility display state, and a low-visibility display state switching determination period for setting the display of the display item to a low-visibility display state that has a lower visibility than the high-visibility display state, and wherein the operations further comprise setting different display switching determination periods between the high-visibility display state switching determination period and the low-visibility display state switching determination period for each of the plurality of display items in accordance with the relevance.

2. The imaging device according to claim 1, wherein the operations further comprise:

setting the high-visibility display state switching determination period to a smaller value than a value of the low-visibility display state switching determination period for the display item having the relevance equal to or greater than a threshold.

3. The imaging device according to claim 1, wherein the operations further comprise:

setting the high-visibility display state switching determination period to a larger value than a value of the low-visibility display state switching determination period for the display item having the relevance less than a threshold.

4. The imaging device according to claim 1, further comprising:

a line-of-sight detector, and wherein the operations further comprise controlling display of the display item in accordance with whether or not the line-of-sight detector has continuously detected a line-of-sight of a user with respect to the display of the display item over the display switching determination period.

5. The imaging device according to claim 4, wherein the operations further comprise:

changing the display of the display item to the high-visibility display state in a case where the line-of-sight detection unit has continuously detected the line-of-sight of the user with respect to a display position of the display item over the high-visibility display state switching determination period.

6. The imaging device according to claim 5, wherein the operations further comprise:

immediately changing the display of the display item to the high-visibility display state after the high-visibility display state switching determination period elapses.

7. The imaging device according to claim 5, wherein the operations further comprise:

gradually changing the display of the display item to the high-visibility display state after the high-visibility display state switching determination period elapses.

8. The imaging device according to claim 4, wherein the operations further comprise:
changing the display of the display item to the low-visibility display state in a case where the line-of-sight detector has not continuously detected the line-of-sight of the user with respect to the display item over the low-visibility display state switching determination period.

9. The imaging device according to claim 8, wherein the operations further comprise:
immediately changing the display of the display item to the low-visibility display state after the low-visibility display state switching determination period elapses.

10. The imaging device according to claim 8, wherein the operations further comprise:
gradually changing the display of the display item to the low-visibility display state after the low-visibility display state switching determination period elapses.

11. A non-transitory computer readable medium storing program code, the program code being executable by a processor to perform operations comprising: setting a display switching determination period for each of a plurality of display items displayed on a display unit in accordance with a set imaging setting related to imaging, wherein the display switching determination period is set for each of the plurality of display items in accordance with a relevance between the imaging setting and the display item, wherein the display switching determination period includes a high-visibility display state switching determination period for setting display of the display item to a high-visibility display state, and a low-visibility display state switching determination period for setting the display of the display item to a low-visibility display state that has a lower visibility than the high-visibility display state, and wherein the operations further comprise:
setting different display switching determination periods between the high-visibility display state switching determination period and the low-visibility display state switching determination period for each of the plurality of display items in accordance with the relevance.

12. The non-transitory computer readable medium according to claim 11, wherein the operations further comprise:
setting the high-visibility display state switching determination period to a smaller value than a value of the low-visibility display state switching determination period for the display item having the relevance equal to or greater than a threshold.

13. The non-transitory computer readable medium according to claim 11, wherein the operations further comprise:
setting the high-visibility display state switching determination period to a larger value than a value of the low-visibility display state switching determination period for the display item having the relevance less than a threshold.

14. The non-transitory computer readable medium according to claim 11, further comprising:
a line-of-sight detector, and
wherein the operations further comprise controlling display of the display item in accordance with whether or not the line-of-sight detector has continuously detected a line-of-sight of a user with respect to the display of the display item over the display switching determination period.

15. The non-transitory computer readable medium according to claim 14, wherein the operations further comprise:
changing the display of the display item to the high-visibility display state in a case where the line-of-sight detection unit has continuously detected the line-of-sight of the user with respect to a display position of the display item over the high-visibility display state switching determination period.

16. A method for controlling an imaging device, the method comprising: setting a display switching determination period for each of a plurality of display items displayed on a display in accordance with a set imaging setting related to imaging, wherein the display switching determination period is set for each of the plurality of display items in accordance with a relevance between the imaging setting and the display item, wherein the display switching determination period includes a high-visibility display state switching determination period for setting display of the display item to a high-visibility display state, and a low-visibility display state switching determination period for setting the display of the display item to a low-visibility display state that has a lower visibility than the high-visibility display state, and wherein the operations further comprise:
setting different display switching determination periods between the high-visibility display state switching determination period and the low-visibility display state switching determination period for each of the plurality of display items in accordance with the relevance.

\* \* \* \* \*